US008938421B2

(12) United States Patent
Jain et al.

(10) Patent No.: US 8,938,421 B2
(45) Date of Patent: Jan. 20, 2015

(54) METHOD AND A SYSTEM FOR SYNCHRONIZING DATA

(76) Inventors: Sandeep Jain, Palo Alto, CA (US); Prakash Chandra Tiwary, Gurgaon (IN)

(*) Notice: Subject to any disclaimer, the term of this patent is extended or adjusted under 35 U.S.C. 154(b) by 340 days.

(21) Appl. No.: 13/457,501

(22) Filed: Apr. 27, 2012

(65) Prior Publication Data

US 2013/0117226 A1  May 9, 2013

(51) Int. Cl.
*G06F 17/30* (2006.01)
*G06F 13/22* (2006.01)

(52) U.S. Cl.
CPC .......... *G06F 13/22* (2013.01); *G06F 17/30008* (2013.01); *G06F 17/30575* (2013.01)
USPC .......................................... 707/624; 707/674

(58) Field of Classification Search
CPC ............... G06F 17/30575; G06F 17/30581
USPC .......... 707/610, 620–625, 616, 674–686, 613
See application file for complete search history.

(56) References Cited

U.S. PATENT DOCUMENTS

| 7,814,067 | B2* | 10/2010 | Souder et al. | 707/682 |
| 8,468,127 | B2* | 6/2013 | Hind et al. | 707/610 |
| 8,645,558 | B2* | 2/2014 | Pope et al. | 709/230 |
| 2006/0230124 | A1* | 10/2006 | Belfiore et al. | 709/219 |
| 2007/0240173 | A1* | 10/2007 | McCoy et al. | 719/329 |
| 2009/0008450 | A1* | 1/2009 | Ebert et al. | 235/439 |
| 2009/0086704 | A1* | 4/2009 | Ho | 370/346 |
| 2010/0191884 | A1* | 7/2010 | Holenstein et al. | 710/613 |
| 2013/0212200 | A1* | 8/2013 | Dennis et al. | 709/206 |

* cited by examiner

*Primary Examiner* — Leslie Wong
(74) *Attorney, Agent, or Firm* — Barry Choobin; Patent360 LLC

(57) ABSTRACT

A computer implemented system and method for synchronizing a plurality of changes from a source computing device to a destination computing device, have been disclosed. The method involves, determining an initial polling time and a last polled time, checking for an elapse of a preset polling interval from a maximum poll time, polling a source for fetching data after an elapse of a polling interval from the maximum poll time, selecting a plurality of changes from the source computing device, processing the fetched data, writing the processed data at a destination computing device and reporting a status of a synchronization process.

13 Claims, 3 Drawing Sheets

METHOD AND A SYSTEM FOR SYNCHRONIZING DATA

CROSS-REFERENCE TO RELATED APPLICATION

This application claims the priority under 35 U.S.C. 119(e) of U.S. Provisional Application Ser. No. 61/480,291 which is included by reference herein.

BACKGROUND

1. Technical Field

The embodiments herein generally relate to a process of data integration and particularly relate to a method of synchronizing data in a process of data integration. The embodiments herein more particularly relate to a method and system for synchronizing data from a source to a destination in real time.

2. Description of the Related Art

A data integration process involves combining the data residing in different sources and providing users with a unified view of the data. In this process, the data is frequently fetched (polled) from a source system to achieve the changes in a destination system. The data integration process becomes significant in a variety of situations such as commercial and scientific fields. In commercial field, the data integration plays very important role in merging the databases of two similar companies. In a similar way, there is a need to provide an integration among the data in scientific field while combining the research results from different repositories.

One important aspect of data integration is a synchronization of data among multiple systems in a real time. At present there are many systems and methods for providing a synchronization of the data among the systems. One important question in the synchronization process is how to write the data and how frequently the data is fetched or polled from the source system. A polling of the data from the source system means reading the data from the source system and the data will be written in the destination system after the reading process. A polling frequency indicates how frequently the data is read from the source system. A difference between the two polling operations is referred to as a polling interval. A polling data can be a data of same entity or different entities or new entity.

Sometimes it needs to qualify different business processes for writing the data to the end systems (destination systems). There may be a failure in writing the data to the end systems on few occasions due to an unavailability of the end system or unqualified or unauthenticated data. During the synchronization process, solutions are provided for a failure in the synchronization process when the application is resumed. The writing of authenticated data to the end system is called a processing of the data. A synchronization process is always expected to synchronize the data as soon as it is generated at the source system. A polling operation can be done frequently to bring the changes quickly. But this will not be enough to bring the source system and the destination system in a synchronized stated until it is processed. Therefore a processing of the data need to be quicker besides a frequent polling process. This problem can be solved by performing a parallel processing operation. A processing of the data in parallel is possible only when the data are independent in nature. But the parallel processing will result in either inconsistency or failure, when the data to be processed are dependent on one another. The existing synchronization solutions are mostly derived based on an event based trigger process or on a scheduler based trigger process. In the event based trigger process, a trigger is enabled at the source system. Whenever a change occurs in the source system, it will be triggered as an event. The event will be further processed during a synchronization process. The event based triggers result in parallel propagation resulting in a missed dependency order. However the scheduler based synchronization solution always searches for the changes in the source system.

During a data integration process, all the changes in the data in the source system are to be carried out to the corresponding data in the destination system thereby satisfying an interdependency of the data. It is to be noted that a solution in the integration process may not always carry out the sequence of the changes in the data in the destination system but it must maintain the interdependency of the data. The data at the source system is generated by a plurality of users with different operations/responsibilities. A new data is generated by creating an entry or updating the existing data or deleting the existing data. When the order of changes in a data in the source system are read randomly during an integration process, the inter dependency of the data between the two changes may be lost. This inter dependency of data can be in the form of a parent-child relationship of a data. Therefore it is important to preserve the order of changes made to the data in the source system.

The main problem in the integration process is to define a way or process to make the changes in the data in an order so that the interdependency of the data in the source system and the destination system are satisfied or maintained. One obvious choice is to carry out the changes in the data in an incremental order, i.e. by arranging the data with respect to the time of generation of the data. As a result, the changes in the data are polled and synchronized in the same order in which the changes in the data are generated. When the changes in the data are made in an incremental order, then an event is generated for every change in the source data and notified during a synchronization process. Moreover the changes in the data are processed during a data integration process. This process will be carried out as long as a synchronization application is running and is made available. When the synchronization application is unavailable because of network or system failure or some other cause, then there is a chance to miss the changes that are generated during the abovementioned down time. This will result in a generation of an inconsistent state between the source system and the destination system. The currently available solutions in the synchronization process generally polls and sorts the changes in the data with respect to a time. This method will not allow for a recovery of the changes lost during a polling process, when the changes are made for a plurality of entities in a same place or when the changes are made for the same entity at a plurality of locations in the same time.

A synchronizing process performs a synchronization of changes in the entities among the incompatible distributed systems. A reliable synchronization process must have a tolerance to faults. It needs to take care of all the failures occurred during a synchronization process. The failures may be an expected/anticipated failure or unexpected/new failure. The examples of the expected/anticipated failures are an unsuccessful transaction on a target side, a non availability of the end system, inappropriate write privileges in the target system. With respect to the expected/anticipated failures during a synchronization process, the system for synchronizing the data knows that synchronization has failed and will take necessary action on the failure after resuming its process. The examples of the unexpected failures are a machine shutdown condition and a server crash condition. During the generation of unexpected/sudden failures during a synchronization process, an integration process may be in progress or a synchronization process might have reached to a certain level and the integration process is interrupted without any prior knowledge. The data may or may not be written on a target system during a failure in a synchronization process. In such circumstances, it is not known when the synchronization application will be active next time after a failure and after a starting up of the system. More clearly one may not be aware of the processing condition after a failure. It is better to poll the changes incrementally, store a time for a source system for restarting a polling process. All the changes done to the entity in the source system will be polled after this stored/waiting time. This stored time/waiting time will be kept updated after processing one change. When a change is written to the destination system, this stored/waiting time is updated with a time stamp of the process event. This time is referred to as last polled time. The next synchronization process will fetch/collect only those changes which are done after the last polled time. But, what will happen, when multiple entities are updated (bulk changes) at same time. The existing processes support the bulk changes, but there is no way for a recovery of the bulk changes in a synchronization process. When the bulk changes are synchronized, the existing solutions will not ensure that the synchronization of the bulk changes are carried out in a correct or right order. Further the existing synchronizing processes will not ensure the appropriate synchronization of the changes in case of any failures like a system crash or an application crash.

In the synchronization process, all the required changes done for an entity in the source system should be transferred and carried out to the entity in the destination system in a sequential order thereby satisfying the dependency among the changes to an entity. A change should not be transferred twice to the destination system and no unwanted change is transferred to the destination system. Till now, it is generally assumed that all the changes in the source system will be polled from a single place. Alternately the changes may be made to the entity in the source system from different locations. Also there is no standard to stipulate that all the changes for an entity need to be stored at the same place. If changes are made to the entity in the source system from different places, then there no other option but to fetch a data from each location individually and process it in order during a data integration process. An integration module accesses a location at one time to poll the changes after some initial waiting time. Then the module accesses another location to poll the changes after an initial waiting time. The polled changes are merged after sorting the changes with respect to the time of change. This process is repeated for all the locations. But there exists a critical situation, in which some changes occur at both the locations and the changes are made at both the locations just after a finishing of polling at a first location but before the starting of polling at a second location. By this time synchronization module will poll the changes from first place after some initial time and will start polling from next place. As a result, the integration module will poll the changes from a first place but will miss the last change at the first place. The handling of the changes from the different locations of a same source generates a problem, when a change history is fragmented. It will be the case, when the created data is stored at one place, while the updates are stored at different places. A standard synchronization module polls the data from the fragmented places and prepares the list by merging the changes done at different places with respect to a time but doesn't maintain the dependency between the changes during a merging process.

The synchronization module interacts with the systems using an authenticated login called as integration user. The integration module reads the changes from a source system and writes the data in a destination system. Consider a scenario of a bi directional integration between two systems S1 and S2. The systems S1, S2 are the source and the destination systems with respect to each other. The users U1 and U2 are the integration users for the systems S1 and S2 respectively. A change C1 is created by an integration user in the system S1. A synchronization module polls the change C1 and writes to system S2. This change in S2 will be made by the user U2 and a change C2 is generated in S2. Now C2 will be polled by user U2 and written in the system S1 using the user U1. It is almost the same set of changes to be written in S1 by the integration module. If the synchronization module allows a writing of change in the system S1, then again a change will be generated in the system S1 and it will be polled and so on. Hence a loop will be created and synchronization module oscillates between these two systems. There are cases where systems or synchronization module does not allow a writing of the changes when the changes have the same value. In this case, a different value can be expected while writing back the changes to the source. For example, this different value can be a traceability link, or a setting key of a destination in a source. Again it will generate a change in the source but this change will be written because of a lack of a destination field. Hence, there is a failure in the synchronization process again. These will result in an indefinite loop. The existing synchronization module generally filters these data to avoid an indefinite loop. But a filtering process is not accurately done using these existing solutions.

None of the currently available systems and methods uses an event based trigger and a scheduler based trigger to synchronize a data from a source to a destination.

Hence, there is a need for a method for synchronizing a data from a source to a destination in real time. There is also a need for a method to address the problems of synchronization with incremental changes, bulk changes and the changes from multiple locations of a source. Further there is a need for a solution to a problem of indefinite loop occurred during a synchronization of the data among multiple systems. Yet there is a need for a method and a system to use both an event based trigger and a scheduler based trigger to synchronize a data from a source to a destination.

The abovementioned shortcomings, disadvantages and problems are addressed herein and which will be understood by reading and studying the following specification.

OBJECTS OF THE EMBODIMENTS

The primary object of the embodiments herein is to provide a method and a system for synchronizing a data from a source system to a destination system.

Another object of the embodiments herein is to provide a method and a system for synchronizing a data from a source system to a destination system in real time.

Yet another object of the embodiments herein is to provide a method and a system for synchronizing a data from a source system to a destination system to handle the incremental changes in a source system.

Yet another object of the embodiments herein is to provide a method and a system for synchronizing a data from a source system to a destination system to handle the bulk changes in a source system.

Yet another object of the embodiments herein is to provide a method and a system for synchronizing a data from a source system to a destination system to handle a plurality of changes from a single location in a source system.

Yet another object of the embodiments herein is to provide a method and a system for synchronizing a data from a source system to a destination system to handle a plurality of changes from a plurality of locations of a source.

Yet another object of the embodiments herein is to provide a method and a system for synchronizing a data from a source system to a destination system to provide a solution for a problem of infinite loop occurring at the time of mutual synchronization between a source and a destination.

Yet another object of the embodiments herein is to provide a method and a system for synchronizing a data from a source system to a destination system to easily create the multi-point interconnections during a synchronization process.

Yet another object of the embodiments herein is to provide a method and a system for synchronizing a data from a source system to a destination system to use the established connectors to connect the appropriate systems during a synchronization process.

Yet another object of the embodiments herein is to provide a method and a system for synchronizing a data from a source system to a destination system to create and manage custom mappings.

Yet another object of the embodiments herein is to provide a method and a system for synchronizing a data from a source system to a destination system to provide a built in support for a recovery management, a conflict detection and management and a failure management.

Yet another object of the embodiments herein is to provide communication in real-time.

Yet another object of the embodiments herein is to provide a method and a system for synchronizing a data from a source system to a destination system to provide a support for a pre and post commit event handling.

Yet another object of embodiments herein is to provide a method and a system for synchronizing a data from a source system to a destination system to provide an extensible and easy to integrate/support additional tools/systems.

Yet another object of the embodiments herein is to provide a method and a system for synchronizing a data from a source system to a destination system to provide a simple installation, a support and a maintenance of a synchronization process.

Yet another object of the embodiments herein is to provide a method and a system for synchronizing a data from a source system to a destination system to make use of a hub and spoke topology to decouple a source and a destination by inserting a central component acting as an active mediator.

Yet another object of the embodiments herein is to provide a method and a system for synchronizing a data from a source system to a destination system to use a hub and spoke technology to provide a flexibility of a system extension.

Yet another object of the embodiments herein is to provide method and a system to use both an event based trigger and a scheduler based trigger to synchronize a data from a source to a destination.

These and other objects and advantages of the embodiment herein will become readily apparent from the following summary and the detailed description taken in conjunction with the accompanying drawings.

SUMMARY

The various embodiments herein provide a method and a system for synchronizing a data from a source to a destination. The method and system provides a real time synchronization among a plurality of systems. The objects defined herein are achieved using a set of algorithms which work together. The algorithms can be used independently or in combination with other to achieve a corresponding novelty.

The method for synchronizing a plurality of changes from a source to a destination comprises the steps of starting with an initial polling time, checking for an elapse of a polling interval from a last polled time, polling a source for fetching a data after an elapse of a polling interval from a last polled time, selecting a plurality of changes from the source made by a user, processing the data fetched at the last polling time in a single thread, writing the processed data at a destination system and reporting a status of a synchronization process. The initial polling time is a time from which a synchronization of changes in a data is initiated.

According to an embodiment herein, a step of polling the source for fetching a data is not initiated until the data fetched at the last polling time is not processed.

According to an embodiment herein, the status is any one of a successful synchronization and an unsuccessful synchronization.

According to an embodiment herein, a step of processing the data fetched at the last polling time comprises a step of ordering the plurality of changes based on a data volume and a location.

According to an embodiment herein, the user is not an integration user.

According to an embodiment herein, the polling interval is set to a very small value and wherein the polling interval is within a range of 1 min to 3 min.

According to an embodiment herein, the integration user is a user authorized to login to the source or the destination.

According to an embodiment herein, a change in the data volume is any one of an incremental change and a bulk change.

According to an embodiment herein, the location is a single location of the source or a plurality of locations of the source.

According to an embodiment herein, the step of ordering the plurality of changes based on the data volume and location comprises receiving the plurality of changes after the initial polling time, and storing the plurality of changes received based on a time, an entity id and a revision id. The data volume is of an incremental change and the location is a single location from the source.

According to an embodiment herein, the step of ordering the plurality of changes based on the data volume and location comprises receiving the plurality of changes and storing a state of a data change for the pluralities of changes received based on a last polled time, a last processed entity Id and a last change Id, when the data volume is of bulk changes and the location is a single location from the source. The last polled time is a change time of an entity and the last processed entity Id is the change entity Id and the last change Id is the change id of a change in the last processed entity. The change entity Id includes a number sequence. The number sequence for a plurality of change entities are assigned in an ascending order in a sequence. The state of a data change is stored for the pluralities of changes received, when the change time is equal to the last polled time and the change entity Id is greater than or equal to the last processed entity Id.

According to an embodiment herein, the step of ordering the plurality of changes based on the data volume and location, when the data volume is of bulk changes and the location is a plurality of locations from the source, comprises querying each location of the plurality of locations to get the last change time, identifying a greater time from a plurality of last change times received from each location with respect to a query, setting the identified greater time of the plurality of last change times as a maximum time, waiting for a preset time equal to 10 seconds before starting a polling process and polling the plurality of changes done after an elapse of the preset waiting time and before a completion of the set maximum time. The last change time is the time at which the pluralities of changes are made at the source at a plurality of locations.

According to an embodiment herein, the step of reporting the status of the synchronization process comprises reporting the source of the successful synchronization after a completion of a successful synchronization process.

According to an embodiment herein, the step of reporting the status of the synchronization process comprises passing a control to a failure manager after an unsuccessful synchronization process.

According to embodiment herein, the method further comprises catching one or more failed events, creating a failure queue and retrying a synchronization process repeatedly for a preset number of attempts after an unsuccessful synchronization process. A change in a data is not written to the destination in the one or more failed events.

According to embodiment herein, the method further comprises employing an event based trigger and a scheduler based trigger to synchronize a data from a source to a destination. When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

According to an embodiment herein, the system for synchronizing a data from a source to a destination comprises a connector framework, a processing manager, a mapping manager, a recovery manager, a conflict manager, a failure manager.

According to an embodiment herein, the connector framework comprises two connector modules, a polling module and an adapter module.

According to an embodiment herein, the processing manager processes a poll event using a processing engine.

According to an embodiment herein, the mapping manager maps a plurality of fields of the source to corresponding fields of a destination.

According to an embodiment herein, the recovery manager automatically recovers a data in case of an unexpected failure.

According to an embodiment herein, the conflict manager solves one or more conflicts occurring during a synchronization process. A conflict is occurred, when a current value of any field of the destination doesn't match with a last value of a field of the source.

According to an embodiment herein, the failure manager controls a failed event during a synchronization process. The failed event is the one in which a change in a data is not written to the destination.

According to an embodiment herein, the polling module reads the plurality of changes from the source and the adapter module to write the plurality of changes at the destination.

According to an embodiment herein, the processing engine is any one of a Java Process Definition Language (JBOSS JPDL), Drools and an Apache Orchestration Director Engine (ODE).

According to an embodiment herein, the processing manager reports a successful synchronization process back to the source after a completion of a successful synchronization process.

According to an embodiment herein, the processing manager passes a control to a failure manager after an unsuccessful synchronization process.

According to an embodiment herein, the recovery manager controls the adapter module and the polling module.

According to an embodiment herein, the conflict manager detects a conflict to activate an integration model to resolve the conflict automatically. The integration model is at least one of a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. An ownership of the entity changes dynamically in the dynamic ownership model. In the peer to peer to model, a plurality of sites is able to make changes to the entities to carry out a conflict detection process and a conflict resolving process. In the custom configuration model, a replication model is customized.

According to embodiment herein, the system further comprises an event based trigger and a scheduler based trigger to synchronize a data from a source to a destination. When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

The system is combination of both an event based trigger and scheduled based trigger. In the event based trigger, generally a trigger is enabled in the source. Whenever a change occurs in the source, the source is triggered as an event and is further consumed by the synchronization solution. Alternatively, the scheduler based trigger solution keeps looking for changes in the source. The system herein looks for the changes at specific time interval and also supports an event based trigger. If the event is generated from the source, the system consumes the event as scheduler job and processes the event.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
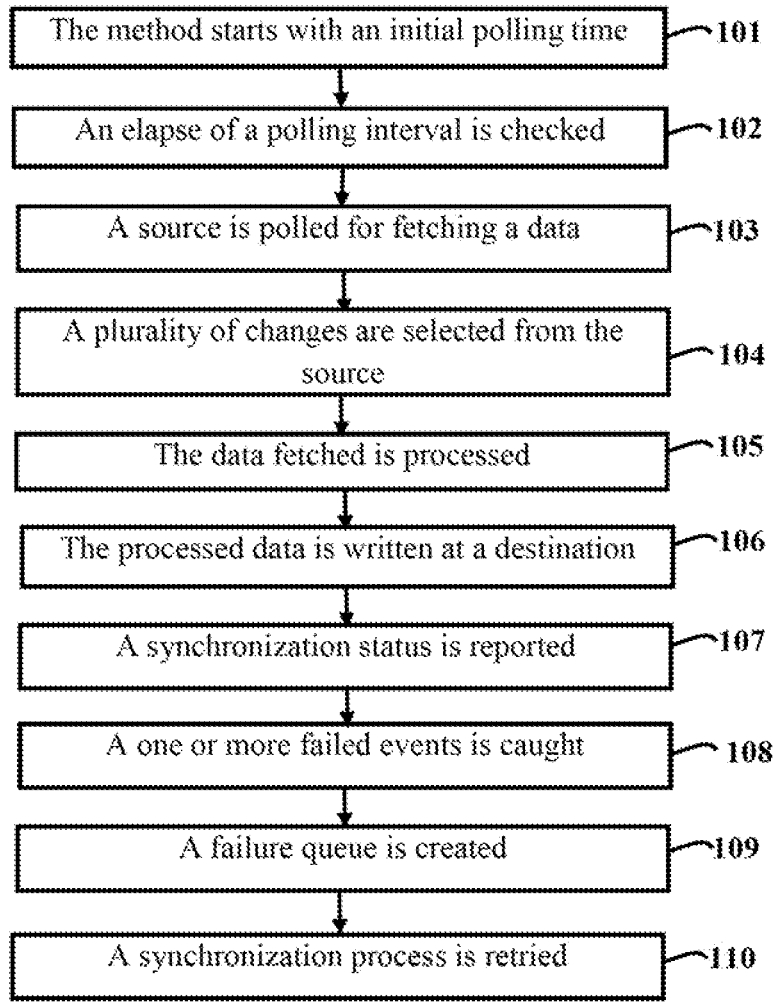
FIG. 1 illustrates a flowchart explaining a method for synchronizing a data from a source system to a destination system, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and a system for synchronizing a data from a source to a destination. The method and system provides a real time synchronization among a plurality of systems. The objects defined herein are achieved using a set of algorithms which work together. The algorithms can be used independently or in combination with other to achieve a corresponding novelty.

The method for synchronizing a plurality of changes from a source to a destination comprises the steps of starting with an initial polling time, checking for an elapse of a polling interval from a last polled time, polling a source for fetching a data after an elapse of a polling interval from a last polled time, selecting a plurality of changes from the source made by a user, processing the data fetched at the last polling time in a single thread, writing the processed data at a destination system and reporting a status of a synchronization process. The initial polling time is a time from which a synchronization of changes in a data is initiated.

According to an embodiment herein, a step of polling the source for fetching a data is not initiated until the data fetched at the last polling time is not processed.

According to an embodiment herein, the status is any one of a successful synchronization and an unsuccessful synchronization.

According to an embodiment herein, a step of processing the data fetched at the last polling time comprises a step of ordering the plurality of changes based on a data volume and a location.

According to an embodiment herein, the user is not an integration user.

According to an embodiment herein, the polling interval is set to a very small value and wherein the polling interval is within a range of 1 min to 3 min.

According to an embodiment herein, the integration user is a user authorized to login to the source or the destination.

According to an embodiment herein, a change in the data volume is any one of an incremental change and a bulk change.

According to an embodiment herein, the location is a single location of the source or a plurality of locations of the source.

According to an embodiment herein, the step of ordering the plurality of changes based on the data volume and location comprises receiving the plurality of changes after the initial polling time, and storing the plurality of changes received based on a time, an entity id and a revision id. The data volume is of an incremental change and the location is a single location from the source.

According to an embodiment herein, the step of ordering the plurality of changes based on the data volume and location comprises receiving the plurality of changes and storing a state of a data change for the pluralities of changes received based on a last polled time, a last processed entity Id and a last change Id, when the data volume is of bulk changes and the location is a single location from the source. The last polled time is a change time of an entity and the last processed entity Id is the change entity Id and the last change Id is the change id of a change in the last processed entity. The change entity Id includes a number sequence. The number sequence for a plurality of change entities are assigned in an ascending order in a sequence. The state of a data change is stored for the pluralities of changes received, when the change time is equal to the last polled time and the change entity Id is greater than or equal to the last processed entity Id.

According to an embodiment herein, the step of ordering the plurality of changes based on the data volume and location, when the data volume is of bulk changes and the location is a plurality of locations from the source, comprises querying each location of the plurality of locations to get the last change time, identifying a greater time from a plurality of last change times received from each location with respect to a query, setting the identified greater time of the plurality of last change times as a maximum time, waiting for a preset time equal to 10 seconds before starting a polling process and polling the plurality of changes done after an elapse of the preset waiting time and before a completion of the set maximum time. The last change time is the time at which the pluralities of changes are made at the source at a plurality of locations.

According to an embodiment herein, the step of reporting the status of the synchronization process comprises reporting the source of the successful synchronization after a completion of a successful synchronization process.

According to an embodiment herein, the step of reporting the status of the synchronization process comprises passing a control to a failure manager after an unsuccessful synchronization process.

According to embodiment herein, the method further comprises catching one or more failed events, creating a failure queue and retrying a synchronization process repeatedly for a preset number of attempts after an unsuccessful synchronization process. A change in a data is not written to the destination in the one or more failed events.

According to embodiment herein, the method further comprises employing an event based trigger and a scheduler based trigger to synchronize a data from a source to a destination. When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

According to an embodiment herein, the system for synchronizing a data from a source to a destination comprises a connector framework, a processing manager, a mapping manager, a recovery manager, a conflict manager, a failure manager.

According to an embodiment herein, the connector framework comprises two connector modules, a polling module and an adapter module.

According to an embodiment herein, the processing manager processes a poll event using a processing engine.

According to an embodiment herein, the mapping manager maps a plurality of fields of the source to corresponding fields of a destination.

According to an embodiment herein, the recovery manager automatically recovers a data in case of an unexpected failure.

According to an embodiment herein, the conflict manager solves one or more conflicts occurring during a synchronization process. A conflict is occurred, when a current value of any field of the destination doesn't match with a last value of a field of the source.

According to an embodiment herein, the failure manager controls a failed event during a synchronization process. The failed event is the one in which a change in a data is not written to the destination.

According to an embodiment herein, the polling module reads the plurality of changes from the source and the adapter module to write the plurality of changes at the destination.

According to an embodiment herein, the processing engine is any one of a Java Process Definition Language (JBOSS JPDL), Drools and an Apache Orchestration Director Engine (ODE).

According to an embodiment herein, the processing manager reports a successful synchronization process back to the source after a completion of a successful synchronization process.

According to an embodiment herein, the processing manager passes a control to a failure manager after an unsuccessful synchronization process.

According to an embodiment herein, the recovery manager controls the adapter module and the polling module.

According to an embodiment herein, the conflict manager detects a conflict to activate an integration model to resolve the conflict automatically. The integration model is at least one of a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. An ownership of the entity changes dynamically in the dynamic ownership model. In the peer to peer to model, a plurality of sites is able to make changes to the entities to carry out a conflict detection process and a conflict resolving process. In the custom configuration model, a replication model is customized.

According to embodiment herein, the system further comprises an event based trigger and a scheduler based trigger to synchronize a data from a source to a destination. When a poll is active at the time of a scheduler based trigger, then the scheduler based trigger is skipped. When an event based trigger is received and no poll is active, then the event based trigger kicks off the polling process. When the poll is active, the event based trigger sets a flag indicating a need to repoll at the end of a poll. At the end of a poll, the repoll flag is checked for. When the repoll flag is set, then another poll cycle is immediately kicked off.

The system is combination of both an event based trigger and scheduled based trigger. In the event based trigger, generally a trigger is enabled in the source. Whenever a change occurs in the source, the source is triggered as an event and is further consumed by the synchronization solution. Alternatively, the scheduler based trigger solution keeps looking for changes in the source. The system herein looks for the changes at specific time interval and also supports an event based trigger. If the event is generated from the source, the system consumes the event as scheduler job and processes the event.

One important question in a data integration process is a way of writing a data and a frequency of polling or fetching the data from a source system. A polling of the data from the source system is reading the data from the source system and writing the read data in a destination system. A polling frequency indicates a frequency of reading or polling the data from the source system. A time difference between the two polling processes is referred as a polling interval. Sometimes a writing of the data to the end systems needs to qualify different business processes. On a few occasion, the writing of data to the end/destination system is failed because of a non availability of the end system or unqualified or unauthenticated data. An integration module generally processes such failure, once an application is resumed to carry out the integration or synchronization process. The writing of an authenticated data to the end system is called a processing of the data. An integration module is always expected to synchronize the data as soon as the data is generated at the source. A polling of the data is done frequently to bring the changes to the end/destination system quickly, but the polling interval is not enough to bring the source and destination systems in a synchronized state until the polled data are processed. Therefore a processing of the polled data need to be faster besides a frequent polling of the generated data/changes in the data.

The states of the changes done for an entity at a source system at different times are tabulated below.

| Time | Entity |
| --- | --- |
| t1 | E1 |
| t2 | E2 |

Where t1 and t2 are the times of generation of a data and t1 <t2. E2 is consequent change done to a change made to or child of E1. The existence of change E2 either does not exist or is meaningless without E1. The type of relation between E2 and E1 is called a parent-child hierarchy.

In destination system, the entity (E1, t1) is written first before writing the entity (E2, t2). A synchronization process is biased in processing the data in a single thread. The synchronization process brings a set of changes and start processing the set of changes to an entity in single thread. Also, the synchronization process does not poll and collect a data from a source until the last set of polled data is processed. In the synchronization process the polling frequency is configurable. The polling frequency is set to a very small value. The synchronizing method should always optimize an idle time between the polling of data and processing of data. There are cases in which the writing of the data takes more time than the polling interval. In such cases a polling of the data is initiated only when the last changes to the entity/data are processed.

The synchronization module collects and transfers all the changes to an entity/data from a source to a destination after satisfying an interdependency of the data. The synchronization module need not take care of the sequence of changes in the destination, but must maintain the interdependency of the data between the source and the destination systems. The data at the source system is generated by multiple users with different operations such as creating some entry, updating the exiting data or deleting the exiting data. It is important to preserving the order of changes to the data in the source. The synchronization process is used to order the changes in such a manner that the interdependency of the data is satisfied. The synchronization process is performed to collect the data by querying the source with respect to time.

For example, all the changes after some time, say T0, are collected. Here T0 is the time from which the changes are to be fetched. Initially T0 is generally decided by a business requirement and later it gets tracked by the synchronization application. T0 is called as a polling time. There may be the cases in which two sets of changes can be found with a same time stamp. These two changes can be interdependent. It is quite possible to have the same timestamp for an entity for different changes. Some system can store time data up to a second or a millisecond or minutes. If the two changes differ only by a millisecond and the system is able to store a time data only up to a second, then the two entities will have a same time stamp. There can be other cases in which the different users are updating the systems or some bulk changes. These all can also result in the entities with the same timestamp. This can be illustrated with an example.

A system is considered such that a time data is stored up to a second and a millisecond part is discarded in the system. There are the two updates with an entity namely E1 and E2 at time t1. E1 and E2 are actually the entity id generated by the system. It is assumed that E1 and E2 are interdependent. Then the time data and the entity are tabulated as follows:

| Time | Entity | System storage time | Actual time |
|------|--------|--------------------|-----|
| t1   | E1     | 10:10:10            | 10:10:10:4 |
| t2   | E2     | 10:10:10            | 10:10:10:5 |

In the above table t1 is system storage time and E1 <E2. Because of dependency, it is expected to write the change {t1, E1 } first and then the change {t1, E2 } in the destination. But by applying a sorting based on a time, we may get the result in a reverse order in a polling and consequently the entities are written in a reverse order in destination i.e. the entity {t1, E2 } is written first, and then the entity {t1, E1 } is written thereby resulting in inconsistency in case of dependency or sometimes it may fail to write at the destination. The problem is resolved by sorting the entity first by time and then by entity id. If the sorting of the entity is done in this way, then the entity {t1, E1 } is successfully written first and then the entity {t2 , E2 } is written in the destination.

But a sorting of the entities with these two attributes is not sufficient. Another case is considered such that a same entity has two different changes with the same time stamps. It is assumed that an entity E1 has two revisions C1 and C2, C1 <C2 at same time stamp t1. C1 & C2 are revisions or change id or version id. The collected data are then tabulated as follows:

| Time | Entity | Change Id | System storage time | Actual time |
|------|--------|-----------|---------------------|-------------|
| t1   | E1     | C2        | 10:10:10            | 10:10:10:6  |
| t1   | E1     | C1        | 10:10:10            | 10:10:11:5  |

It is further assumed that there is a dependency between C1 and C2. When the above case/data is sorted by a time followed by an entity id, the sequence {t1, E1, C2 }, {t1, E1, C1 } is obtained. But it is expected to synchronize the entities in the following order {t1, E1, C1 }, {t1, E1, C2 } to maintain the interdependency between the entities. The changes should be ordered while polling/querying from a source database, so that it is written in a right order in the destination.

One more dimension such as a revision id is added in ordering. To maintain the interdependency between the changes in the entity, it is required to order the changes by time, entity and revision, and wherein the time is the point at which an entity is updated, entity is the entity/data that is updated and revision is the id for a change done in the entity. With respect to the above mentioned case, sorting the data with a time followed by an entity which is again followed by a revision results in a sequence {t1, E1, C1 }, {t1, E1, C2 }. The first order is to sort the changes with respect to time. When the time is same for both the changes, then the changes are sorted by the entity. When both the time and entity are same, then the changes are sorted by revision.

A synchronization process is used to synchronize the changes among the incompatible distributed systems. A reliable synchronization process must be fault tolerance and is able to handle the failures. The failures can be expected or unexpected. The examples for the expected failures are an unsuccessful transaction at a destination, a non-availability of an end system, an inappropriate write privileges in a destination. With respect to the expected failures, the synchronization module should know that a synchronization process is failed and it is necessary to take an action on it after resuming a processing state. The processing state is the status of a synchronization process at the time of a failure. The examples for the unexpected failures are a machine shutdown and a server crash in which an integration process may be in the midst of a processing and a synchronization process might have reached to a certain point and the integration process is interrupted without any prior knowledge. During a failure, a data may or may not be written to a target in the integration process. The last processed time and the last processed entity are stored. Then the integration process is resumed to store the Last Polled Time and the Last Processed EntityId.

Consider the example in which the time and the entity revision are tabulated as follows:

| Time | Entity Revision |
|------|-----------------|
| t1   | E1              |
| t1   | E2              |
| t1   | E3              |
| t2   | E4              |

The entities E1, E2 and E3 are updated at a time t1 and the entity E4 is updated at a time t2 and initial state is Last Polled Time=t0 and Last Processed Entity Id=E0. The synchronization solution polls the changes after t0 and if time is t0, then Entity Id>E0. After processing the change {t1, E1 } and updating the state/condition to a Last Polled Time=t1 and Last Processed Entity Id=E1 in a synchronization process, the system is crashed down during a synchronization of the change {t1, E2 }. An integration process is resumed after x time and poll changes are done after t1 and if time is t1 and the Entity Id>E1, then a desired result is {t1, E2 }, {t1, E3 } and {t2, E4}.

Now a new case is considered such that the same entity is updated multiple times in the system. For the systems which store the change time upto seconds level or just upto minutes level, it becomes comparatively easy to update the entity within same second when the system stores time data till second level or update the entity multiple times in a single minute when the system stores a time data only till minutes.

The synchronization module maintains a state for Last Polled Time, Last Processed Entity Id and Last Change Id. The Last Change Id is the change id of the change for a given entity that was last processed. The Polling criteria is to get all the changes where the change Time>=Last Polled Time and (change Entity Id>Last Processed Entity Id) or (change Time=Last Polled Time and change Entity Id=Last Processed Entity Id and entity change Id>Last Change Id). After processing an event, the synchronization process is done to store the change Time as Last Polled Time, change Entity Id as Last Processed Entity Id and entity change Id as Last Change Id.

An integration solution should satisfy the following conditions. All the required changes at the source is transferred to the destination in an order which satisfies the dependency among the changes, a change should not be transferred twice to the destination and no unwanted change is transferred to the destination. During a synchronization process a polling is started with an initial time to get the changes after that time and the changes are sorted based on time, entity id and revision id. Consider the case in which the changes are made at different locations of source system. It is practical that a system stores a change log for its CREATE, UPDATE and DELETE operations at different places. Also there is no standard which says that all these operation logs need to be stored at a same place. Consider that systems store a change history for create, update and delete operations at different places. The synchronization solution counters the situation by polling the changes within a time window. The time widow is characterized by a start time and an end time. It is obvious for a polling process that the starting point of this window is our initial polling time. The maximum time is the maximum of all the last updates time of each location.

For example the time and entity data for the changes at two different locations are tabulated as follows:

| Location: L1 | | Location: L2 | |
| --- | --- | --- | --- |
| Time | Entity | Time | Entity |
| T1 | E1 | T2 | E1 |
| T2 | E2 | T3 | E2 |

Maximum time = max (T2, T3) = T3

Then a synchronization process is carried out with the following steps. Step 1: At an initial state, the condition of time and entity at different locations are as follows:

| Location: L1 | | Location: L2 | |
| --- | --- | --- | --- |
| Time | Entity | Time | Entity |
| T1 | E1 | T2 | E1 |
| T2 | E2 | T3 | E2 |

Where T1 < T2 < T3
Maximum time = max (T2, T3) = T3

Step 2: A polling is started from the location L1 and the polling is done only for the changes between T0 and T3 (by setting a time window between T0 and T3).
Step 3: Location L1 gets updated by some changes at time T4 and L2 gets updated at T5, such that T1 <T2 <T3 <T4 <T5, so the current state of the change log is as follows:

| Location: L1 | | Location: L2 | |
| --- | --- | --- | --- |
| Time | Entity | Time | Entity |
| T1 | E1 | T2 | E1 |
| T2 | E2 | T3 | E2 |
| T4 | E3 | T5 | E3 |

Step 4: In such a case, the polling is started from the location L2 to fetch the changes between T0 and T3.
Step 5: Then the fetched changes are sorted and sent for processing. Maximum update time=T3.
Step 6: The polling is started for the next time after T3, so that the changes to the entity at the time T4 is not missed now.

In a system where the changes are stored at multiple places, a time window is needed for a polling process. Consider the situation in which the system stores a user request time instead of a system own time (database entry time). In such a case, a user makes a request at T1 and entry is saved in database at T2. The update time for this change entry is T1 instead of T2. Now consider a case in which a user makes two requests respectively at times T3 and T4 such that T3 <T4. The source system processes both the requests and saved the request at T4 first and the request at T3 later.

During an integration process, when the polling is done just after T4, the integration application gets the change of T4 and processes the received change at T4. When a polling is done in the next time after T4, then a change at T3 is missed. Even when the maximum time is set as T4 then also a change at T3 is missed as the entry for T3 is not yet done in system. To solve this problem, get a maximum time and wait for some time so that the query source gets all the change events between an initial time and the maximum time. When the time window is kept small, then a probability of missing such events is high and when the time window is kept long then a processing time is increased thereby affecting a transition of an event from a source system to a destination system. The wait time is kept as 10 seconds so as to give enough time to the source system to process such events. A time of less than 10 seconds is too less and increases a probability. A time of more than 10 seconds say 15 seconds increases a processing time so that it takes a time of 1 min and 15 seconds to get an entity posted to a destination with a polling interval of 1 min.

The synchronization application is operated to interact with the systems using some authenticated login, called as integration user. Using the integration user, an integration application is operated to read the changes from a source and to write the data in a destination. Consider a scenario of a bi directional integration between two systems S1 and S2. In such a case, the systems S1, S2 behave like source and destination systems with respect to each other. The users U1 and the users U2 are the integration users for the systems S1 and S2 respectively. A change C1 is created by an integration user in the system S1. The integration process is performed to poll the change C1 and to write the change to the system S2. This change in S2 is done by the user U2 and a change C2 is generated in the system S2. Now C2 is polled by user U2 and is written in the system S1 by the user U1. It is almost the same set of changes (same in value) that is written in the system S1. When a synchronization application allows a writing of the changes in the system S1, then again another change is generated in the system S1 and the change is polled and so on. Thus a loop is created and a synchronization process is repeated again and again between the two systems. There are cases where the systems or integration application do not allow a writing of the changes when the changes has the same value. In such a case, a different value is expected while writing back the changes to the source. For example, this different value is a traceability link, or a setting key of a destination in source. Again a change is generated in the source and the change is polled to write but the writing of this change is failed because of a lack of a destination field. Thus the synchronization process is failed again. The synchronization solution for such case is to filter out the changes generated by the integration user. The integration user is kept as a reserved user. The integration user is restricted not to generate any data to the system and allow the integration application only to generate data. A restriction is put over a polling query such that all the changes which are note generated by the integration user are fetched. However the restriction over the integration is not required in case any data is not written in the source.

Generally all enterprise application is provided with an audit log. It is also called as a history log. The audit log contains all the information about the changes. A change is a new set of value given by some user at a certain time. Most of the systems store these values, the changes, the new value, the old value and time. However there are systems which maintain a history log, but do not have information about the user. For this case, a read only custom field is created in the system. When an integration user writes to such end system, the field is updated. The combination of time and user related information is stored kept. The time field is checked to detect a recent update in the changes. When the field is made available to the users, the users can write any field and as a result a mistake is created. So a read only field is used.

FIG. 1 illustrates a flowchart indicating a method for synchronizing data from a source to a destination, according to an embodiment herein. The method comprises the steps of starting with an initial polling time. The initial polling time is a time from which a synchronization of changes in a data is initiated. The polling interval is set to a very small value and the polling interval is set within a range of 1 min to 3 min. (101). An elapse of a polling interval from a last polled time is checked (102). A source is polled for fetching a data after an elapse of a polling interval from a last polled time. A step of polling the source for fetching a data is not initiated until the data fetched at the last polling time is not processed (103). A plurality of changes made by a non-integration user is selected from the source. According to an embodiment herein, the integration user is a user authorized to login to the source or the destination (104).

The data fetched at the last polling time is processed in a single thread (105). The step of processing the data fetched at the last polling time comprises a step of ordering the plurality of changes based on a data volume and a location. The change in the data volume is any one of an incremental change and a bulk change and the location is a single location of the source or a plurality of locations of the source.

According to an embodiment herein, the step of ordering the plurality of changes based on the data volume and location comprises receiving the plurality of changes after the initial polling time, and storing the plurality of changes received based on a time, an entity id and a revision id, when the data volume is of an incremental change and the location is a single location from the source.

According to an embodiment herein, the step of ordering the plurality of changes based on the data volume and location comprises receiving the plurality of changes and storing a state of a data change for the pluralities of changes received based on a last polled time, a last processed entity Id and a last change Id, when the data volume is of bulk changes and the location is a single location from the source. The last polled time is a change time of an entity and the last processed entity Id is the change entity Id and the last change Id is the change id of a change in the last processed entity. The change entity Id includes a number sequence. The number sequence for a plurality of change entities are assigned in an ascending order in a sequence. The state of a data change is stored for the pluralities of changes received, when the change time is equal to the last polled time and the change entity Id is greater than or equal to the last processed entity Id.

According to an embodiment herein, the step of ordering the plurality of changes based on the data volume and location, when the data volume is of bulk changes and the location is a plurality of locations from the source, comprises querying each location of the plurality of locations to get last changes, identifying a greater time from a plurality of last change times received from each location with respect to a query, setting the identified greater time of the plurality of last change times as a maximum time, waiting for a preset time equal to 10 seconds before starting a polling process and polling the plurality of changes done after an elapse of the preset waiting time and before a completion of the set maximum time. The last change time is the time at which pluralities of changes are made at the source at a plurality of locations.

The processed data is written to a destination (106). A status of the synchronization process is reported. The report notifies a successful synchronization process or an unsuccessful synchronization process. The successful synchronization process is notified to the system after a completion of a successful synchronization process (107). A one or more failed events is caught. A change in a data is not written to the destination in the one or more failed events (108). A failure queue is created (109). After an unsuccessful synchronization process a control is passed to a failure manager. A synchronization process is retried repeatedly for a preset number of attempts after an unsuccessful synchronization process (110). According to embodiment herein, the method further comprises deploying an event based trigger and a scheduler based trigger to synchronize a data from a source to a destination.

Figure 2:
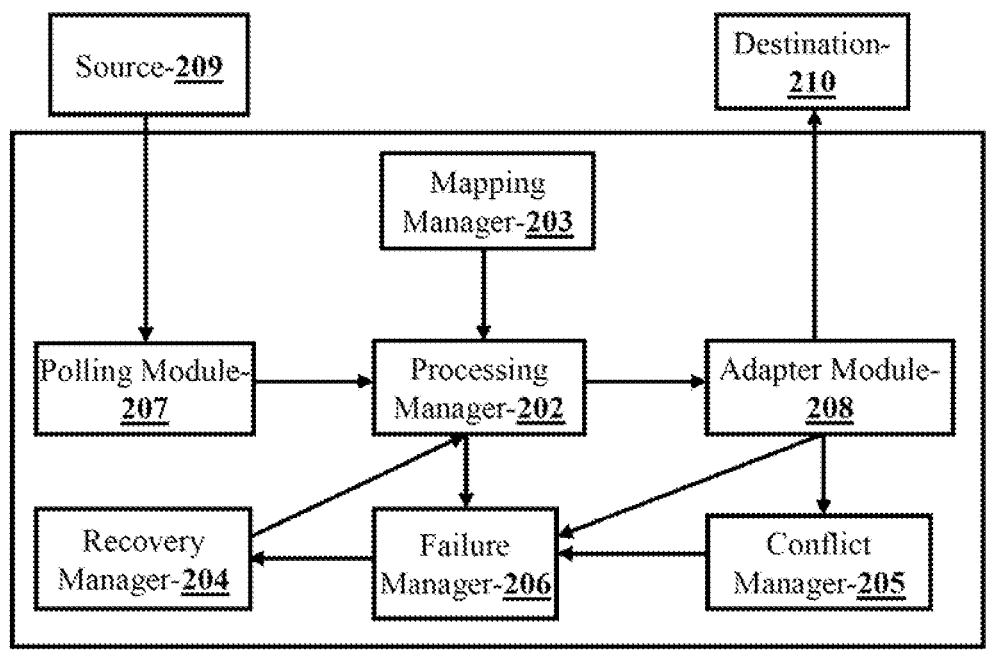
FIG. 2 illustrates a block circuit diagram of a system for synchronizing a data from a source system to a destination system, according to an embodiment herein.

FIG. 2 illustrates a block circuit diagram of a system for synchronizing data from a source to a destination. As shown in FIG. 2, the system comprises a connector framework, a processing manager 202, a mapping manager 203, a recovery manager 204, a conflict manager 205 and a failure manager 206. The connector framework comprises two connector modules, a polling module 207 and an adopter module 208. The polling module 207 reads the plurality of changes from the source 209 and the adapter module writes the plurality of changes at the destination 210.

The processing manager 202 processes a poll event using a processing engine. The processing engine is any one of but not limited to a Java Process Definition Language (JBOSS JPDL), Drools and an Apache Orchestration Director Engine (ODE). The processing manager 202 further reports a successful synchronization process back to the source 209 after a completion of a successful synchronization process. After an unsuccessful synchronization process the processing manager passes 202 a control to a failure manager 206.

The mapping manager 203 maps a plurality of fields of the source 209 to corresponding fields of a destination.

The recovery manager 204 automatically recovers a data in case of an unexpected failure. The recovery manager 204 further controls the adapter module 208 and the polling module 207.

The conflict manager 205 solves one or more conflicts occurring during a synchronization process. A conflict is occurred, when a current value of any field of the destination does not match with a last value of a field of the source 209.

The failure manager 206 controls a failed event during a synchronization process. The failed event is the one in which a change in a data is not written to the destination 210.

The conflict manager 207 detects a conflict to activate an integration model to resolve the conflict automatically. The integration model is at least one of but not limited to a master/slave model, a partitioned ownership model, a dynamic ownership model, a peer to peer model and a custom configuration model. In the master/slave model, the entity is created at the master and one or more read only copies of the entity are created in slave system. In the partitioned ownership model, one or more fields of the entity are created at one or more systems. In the dynamic ownership model, an ownership of the entity changes dynamically in the dynamic ownership model. In the peer to peer to model, a plurality of sites is able to make changes to the entities to carry out a conflict detection process and a conflict resolving process. In the custom configuration model, a replication model is customized.

According to embodiment herein, the system further comprises an event based trigger and a scheduler based trigger to synchronize a data from a source to a destination.

The system is combination of both an event based trigger and scheduled based trigger. In the event based trigger, generally a trigger is enabled in the source 209. Whenever a change occurs in the source 209, the source 209 is triggered as an event and is further consumed by the synchronization solution. Alternatively, the scheduler based trigger solution keeps looking for changes in the source 209. The system herein looks for the changes at specific time interval and also supports an event based trigger. If the event is generated from the source 209, the system consumes the event as scheduler job and processes the event.

Figure 3:
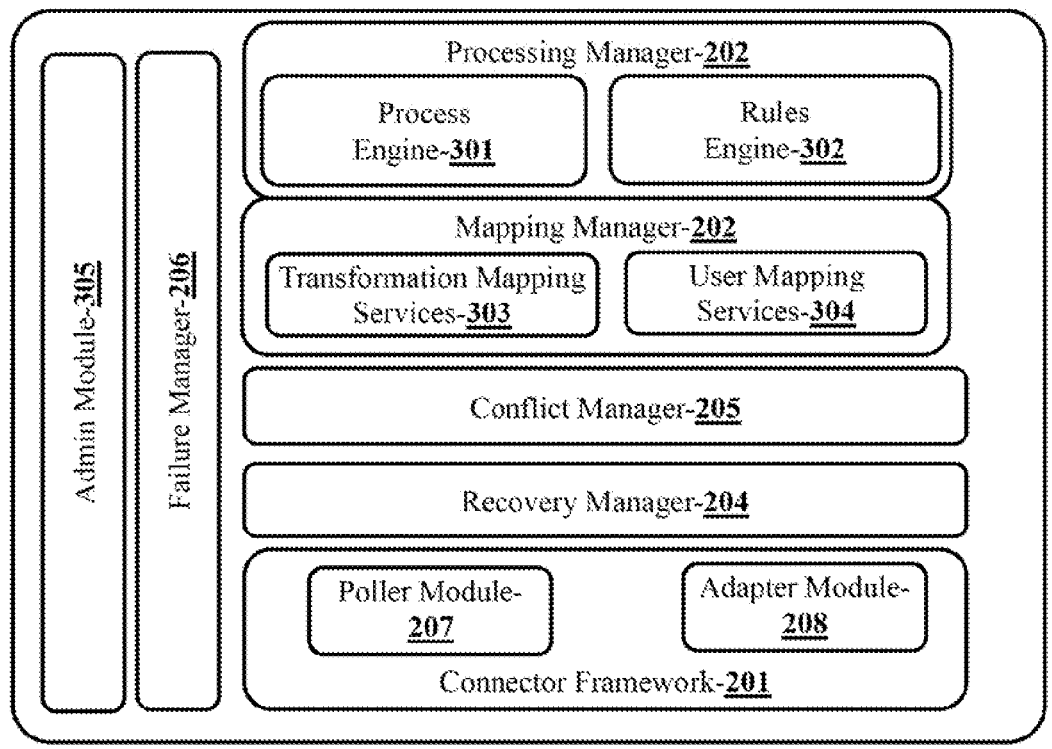
FIG. 3 illustrates a functional block diagram of a system for synchronizing a data from a source system to a destination system, according to an embodiment herein.

FIG. 3 illustrates a functional block diagram of a system for synchronizing data from a source to a destination. An Integration Manager (IM) framework based on Enterprise Service Bus (ESB) principle is a key component of the architecture. The architecture is based on a hub and spoke topology. According to FIG. 3, the system comprises a connector framework 201 and connectors. The connector framework 201 is further provided with two sub modules such as a polling module 207 and an adapter module 208. The polling module 207 is responsible for reading the data changes from the source and adapter module 208 is responsible for writing the data to the destination.

The system includes a processing manager 201 responsible for processing a poll event. The processing manager 201 uses processing engine 301 for processing the data. The processing engine 301 is one of but not limited to JBOSS JPDL & Drools, Apache ODE. The rule engine 302 executes one or more business rules in a runtime production environment. The rules might come from a legal regulation, company policy or other sources. The rule engine 302 enables the company policies and other operational decisions to be defined, tested, executed and maintained separately. The processing manager 202 takes an action on a success or failure of a synchronizing process of the event. In general on completion of a successful synchronization process, the processing manager 202 notifies the source regarding the successful synchronization of an event or entity at the destination and adds the destination link of the event.

After a failure of the synchronization process, the processing manager 202 passes the failure report to a failure manager 206. The failure manager 206 controls the entire failed event during a synchronization process. The failed events are those in which a writing of changes to destination system is failed. OIM catch those events and create a failure queue. A synchronization process is retried repeatedly for a preset number of attempts after an unsuccessful synchronization process. The entire failed events can be notified and can be processed after human intervention.

The architecture further comprises a mapping manager 202 responsible is for mapping different fields of the source system to corresponding field of the destination. A transformation mapping services 303 of the mapping manager 202 provides transformation of one field in the source to a corresponding field in the destination. The user mapping services 304 maps a portal user ID to the user ID of synchronization system.

In case of system failure or any unexpected failures a recovery manager 204 automatically recovers the data. The recovery manager 204 controls both adapter module 208 and polling module 207. A new connector such as polling module 207 or an adapter module 208 does not need any kind of configuration or coding.

The conflict Manager 205 solves all the conflicts occurring during a synchronization process. A conflict occurs when the current value of any field of destination does not match with last value of the source field. The conflict manager 205 detects a conflict and also gives a plurality of integration models to resolve the conflict automatically. The integration model is at least one but not limited to a Master/Slave model, a partitioned ownership model, a dynamic ownership model, a peer to peer model and a custom configuration model.

In the Master/Slave model, an entity is mastered at one source and read only copies of the entities are created in other development systems. All changes to the entities must be made in the master. In the partitioned ownership model, different fields of the entity are mastered at different systems. In the dynamic ownership model, the entity ownership changes dynamically, but there is only one owner at any time. The current owner is indicated based on a value of a field in the entity. Only the current owner can pass the ownership to someone else. In the peer to peer model, the changes to the entities can be made from multiple sites. The peer to peer model typically performs a conflict detection process and a conflict resolution process. In the custom configuration model, the actual replication model is custom defined and typically it is a mixture of combination of the previous models.

The embodiments herein provide a method and system for synchronizing data from a source to a destination in real time. The embodiments herein provide a unified method and system to handle incremental changes, bulk changes, a plurality of changes from a single location in a source and a plurality of changes from a plurality of locations of a source. The method herein provides a solution for a problem of infinite loop occurring at the time of mutual synchronization between a source and a destination.

Using the proposed method and system one can easily create Multi-Point interconnections. The embodiments herein use the established connectors to connect the appropriate systems. The embodiments herein are further used to create and manage custom mappings. The method and system provides a built in support for a recovery management, a conflict detection and management, and a failure management. A support for pre and post commit event handling is provided. The installation, a support and maintenance of the synchronization solution is very simple.

One of the major advantages of hub and spoke topology is that it decouples the source and destination by inserting a central component acting as an active mediator. The extension of the system implementing a hub and spoke architecture is also very flexible as compared with a point to point integration. The central component acting as a hub can be reused while adding extra spokes to the system. The architecture also reduces the number of interfaces needed to build and maintain the system. Since all the components are loosely coupled, in IM architecture, it is easy to switch to the processing engine. A recovery manager of the proposed system guarantees "NO LOSS DATA" model.

The embodiments herein ensure that the information in multiple systems is consistent across the systems. The solution can be useful for distributed and non-compatible system integration process. The embodiments provide a common gateway for accessing a non legacy system. Using the proposed techniques, the legacy system can be a front-end cluster of applications, providing the user with a single interface, the legacy system and enables the user to work with other systems. The solution fetches the event from a source and writes the event to a destination separately. It allows a space between a read and write operations. Hence a processing of event can be qualified by some business logic. Thus it provides a policy or business based integration.

The main objective of IM is to integrate the engineering systems and build an automated and transparent engineering ecosystem with full traceability. A current version of IM supports a bidirectional integration between the systems like Defect Tracking Systems (Jira, Bugzillaetc), Software Quality Management System (HP Quality Center), Product Management System (Rational Doors, Microsoft TFS etc), Application Management system (ALMCompleteetc). The techniques can be used in IT industry like ALM integration, SCM integration or non-it industry like Telecom for ERP integration. The common usage in IT industry is a policy based source code management with defect system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer-implemented method for synchronizing data from a source computing device to a destination computing device, said method comprising the following steps:
   determining, using a polling module, an initial polling time, wherein the initial polling time is a time from which a synchronization of changes in at least one data is initiated, and determining, using the polling module, a last polled time indicative of the maximum last update time the data entities in the source computing device which were synchronized to the destination computing device previously, or if no previous synchronization then set to zero, and determining a maximum poll time, wherein said maximum poll time is the highest time at which changes to at least one data entity were performed in the source computing device;
   checking, using the polling module for an elapse of a configurable polling interval from the maximum poll time, wherein the configurable polling interval represents the maximum time a transaction can remain active on the source computing device;
   polling, using the polling module, a source computing device, and fetching the data entities changed between the last polling time, and the maximum poll time after an elapse of the polling interval from the maximum poll time;
   selecting a plurality of changes, using the polling module, from the source computing device, said changes inflicted by a user on the data entities, wherein the polling of the source computing device is not initiated until the data entities fetched at the last polling time are processed;
   processing, using the processing module, the fetched data entities and ordering the changes inflicted on the fetched data entities, based on at least the time and entity ID;
   writing the processed data entities to the destination computing device, using the adapter module; and
   reporting, using the processing module, a status of the data synchronization process.

2. The method of claim 1, wherein the polling frequency is configurable, said polling frequency being set to a default value of 1 minute.

3. The method of claim 1, wherein the step of ordering the plurality of changes, further comprises the step of:
   receiving via the polling module, the plurality of changes after the last poll time, and storing the received changes based on at least a time, an entity ID and a revision ID; and
   selectively processing the data entities at the processing module, and ordering the data entities based on at least the time and entity ID.

4. The method of claim 1, wherein the step of ordering the plurality of changes, using the processing module, further includes the following steps:
   querying each location of the plurality of locations to get respective last change time(s), wherein the last change time is the time at which changes are inflicted upon the data entities at a plurality of locations;
   identifying the greatest time from the plurality of last change time(s) received from each location with respect to a query;
   setting the identified greatest time amongst the plurality of last change times as a maximum time;
   waiting for a configurable, preset time period before starting a polling process; and
   polling the change(s) inflicted on the data entities, after an elapse of the preset waiting time and before completion of the set maximum poll time.

5. The method of claim 1, wherein the step of reporting the status of the synchronization process comprises passing a control to a failure manager after an unsuccessful synchronization process.

6. The method of claim 5, further comprises:
   catching, at the failure manager, one or more failed events and wherein a change in a data is not written to the destination in the one or more failed events;
   creating, at the failure manager, a failure queue; and retrying a synchronization process repeatedly for a preset number of attempts after an unsuccessful synchronization process.

7. The method of claim 1, further comprises synchronizing the data from a source to a destination using an event based trigger and a scheduler based trigger.

8. The method as claimed in claim 1, wherein the initial poll time is the same as the last polled time at the beginning of the polling, and wherein at the end of the polling, the last polled time is indicative of the maximum last update time the data entities in the source computing device were synchronized to the destination computing device.

9. The method as claimed in claim 1, wherein the step of ordering the plurality of changes using the processing module, further includes the following steps:
   ordering the plurality of changes with respect to time;
   ordering the plurality of changes with respect to entity ID, in the event that the time for a plurality of changes is the same; and
   ordering the plurality of changes with respect to a revision ID in the event that the time entity ID for a plurality of changes are the same.

10. A computer implemented system for synchronizing data from a source computing device to a destination computing device, said system comprising:
   a polling module configured to
      determine an initial polling time, wherein the initial polling time is a time from which a synchronization of changes in at least one data entity is initiated;
      determine a last polled time indicative of the maximum last update time the data entities in the source computing device were synchronized to the destination computing device previously, or if no previous synchronization then set to zero;
      determine a maximum poll time, wherein said maximum poll time is the highest time at which changes to at least one data entity were performed in the source computing device;
      check, for an elapse of a configurable polling interval from the maximum poll time, wherein the configurable polling interval represents the maximum time a transaction can remain active on the source computing device;
      poll the source computing device, and fetch the data entities changed between the last polling time, and the maximum poll time after an elapse of the polling interval from the maximum poll time;
      select a plurality of changes, from the source computing device, in a single thread, wherein the polling of the source computing device is not initiated until the data entities fetched at the last polling time are processed;
   a processing module cooperating with the polling module, said processing module configured to process the fetched data entities in a single thread and order the changes inflicted on the fetched data entities, based on at least the time and entity ID, said processing module further configured to report status of the data synchronization process; and
   an adapter module cooperating, with the processing module, said adapted module configured to write the processed data entities generated by the processing module, into the destination computing device.

11. The system as claimed in claim 10. wherein the processing module is further configured to receive the changes inflicted on the data entities, after the last polled time, and storing the received changes based on at least a time, an entity ID and a revision ID); said processing module further configured to selectively process the data entities at the processing module, and order the data entities based on at least the time and entity ID.

12. The system as claimed in claim 11, wherein the processing module is further configured to query a plurality of locations to identify the latest set of changes inflicted on a given data entity, and identify the timing of the latest change (s) inflicted, on the data entity at each of the locations, and identify the greatest time therefrom, said processing module further configured to set the identified greatest time as the maximum time, said processing module further configured to initiate polling after the elapse of a preset waiting time after the end of the set maximum time.

13. The system as claimed in claim 10, wherein the system further includes a failure manager module configured to catch the failed synchronization events and create a failure queue, said failure manager module further configured to instruct the polling module to retry the synchronization for a preset number of times.

* * * * *